(12) United States Patent
Shimizu

(10) Patent No.: US 8,154,736 B2
(45) Date of Patent: Apr. 10, 2012

(54) IMAGE FORMING APPARATUS, TRAY ID ALLOCATING METHOD THEREOF, COMPUTER PROGRAM PRODUCT, AND RECORDING MEDIUM

(75) Inventor: Yuuko Shimizu, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1322 days.

(21) Appl. No.: 11/819,387

(22) Filed: Jun. 27, 2007

(65) Prior Publication Data

US 2008/0016561 A1 Jan. 17, 2008

(30) Foreign Application Priority Data

Jun. 30, 2006 (JP) ................................. 2006-181344

(51) Int. Cl.
*G06F 13/00* (2006.01)
(52) U.S. Cl. ........ 358/1.1; 358/1.15; 358/1.9; 358/1.13; 358/1.18; 399/45; 399/12; 707/769; 707/698
(58) Field of Classification Search .................. 358/1.15, 358/1.1, 1.9, 1.13, 1.18, 1.12, 1.14; 399/45, 399/12, 82, 81; 709/203; 726/21; 355/40, 355/41, 42, 43; 710/100, 30; 707/698, 769
See application file for complete search history.

(56) References Cited

U.S. PATENT DOCUMENTS

| | | | | | |
|---|---|---|---|---|---|
| 5,197,118 | A * | 3/1993 | Sato et al. | ...................... | 358/1.5 |
| 5,586,301 | A * | 12/1996 | Fisherman et al. | ........... | 711/152 |
| 5,657,455 | A * | 8/1997 | Gates et al. | .................... | 710/100 |
| 6,577,903 | B1 * | 6/2003 | Cronin et al. | ................. | 607/102 |
| 6,594,545 | B1 * | 7/2003 | Kakigi | .......................... | 700/223 |
| 6,615,293 | B1 * | 9/2003 | Shima et al. | ..................... | 710/30 |
| 6,646,758 | B1 * | 11/2003 | Anderson et al. | ............ | 358/1.15 |
| 6,781,709 | B2 * | 8/2004 | Nozawa | ....................... | 358/1.12 |
| 6,842,766 | B2 * | 1/2005 | Brockway et al. | ............ | 709/203 |
| 6,900,912 | B1 * | 5/2005 | Miyake | .......................... | 358/474 |
| 7,072,596 | B2 * | 7/2006 | Smith et al. | ..................... | 399/45 |
| 7,251,047 | B2 * | 7/2007 | Meade, II | ..................... | 358/1.13 |
| 7,375,842 | B2 * | 5/2008 | Kloosterman et al. | ........ | 358/1.18 |
| 7,532,355 | B2 * | 5/2009 | Gauthier et al. | ............. | 358/1.18 |
| 7,636,040 | B2 * | 12/2009 | Yoshida | ........................ | 340/525 |
| 7,720,859 | B2 * | 5/2010 | Wakazono | .................... | 707/769 |
| 7,801,871 | B2 * | 9/2010 | Gosnell | ........................ | 707/698 |
| 2003/0098540 | A1 * | 5/2003 | Hong | ........................... | 271/9.01 |
| 2005/0259277 | A1 * | 11/2005 | Ferlitsch | ........................ | 358/1.9 |
| 2006/0023239 | A1 * | 2/2006 | Ferlitsch | ..................... | 358/1.13 |
| 2006/0139661 | A1 * | 6/2006 | Kumashio | ...................... | 358/1.1 |
| 2007/0150968 | A1 * | 6/2007 | Chiba et al. | ..................... | 726/31 |
| 2007/0182977 | A1 * | 8/2007 | Martin et al. | ................ | 358/1.13 |

(Continued)

FOREIGN PATENT DOCUMENTS

JP 2002-281111 A 9/2002

(Continued)

*Primary Examiner* — David K Moore
*Assistant Examiner* — Ashish K Thomas
(74) *Attorney, Agent, or Firm* — Harness, Dickey & Pierce, P.L.C.

(57) ABSTRACT

An image forming apparatus has at least one tray for feeding or discharging a sheet, and includes an input tray ID holding unit which holds an input tray ID that is optionally input so as to identify the tray, an initial tray ID holding unit which holds an initial tray ID set beforehand so as to identify the tray, a tray ID comparing unit which compares the input tray ID and the initial tray ID, and a tray ID allocating unit which allocates a new tray ID to the tray to which the initial tray ID is allocated, when the input tray ID and the initial tray ID are found overlapped as a result of the comparison by the tray ID comparing unit.

11 Claims, 10 Drawing Sheets

U.S. PATENT DOCUMENTS

| | | | |
|---|---|---|---|
| 2007/0229881 A1* | 10/2007 | Matsubara et al. | 358/1.15 |
| 2007/0263242 A1* | 11/2007 | Takahashi | 358/1.14 |
| 2008/0180721 A1* | 7/2008 | Ferlitsch | 358/1.15 |
| 2008/0192291 A1* | 8/2008 | Honda et al. | 358/1.15 |
| 2009/0175633 A1* | 7/2009 | Shimizu | 399/12 |

FOREIGN PATENT DOCUMENTS

| | | |
|---|---|---|
| JP | 2004-056390 A | 2/2004 |
| JP | 2004-160692 A | 6/2004 |
| JP | 2004-246733 A | 9/2004 |
| JP | 2004-350145 A | 12/2004 |
| JP | 2005-044030 A | 2/2005 |
| JP | 2005-174052 A | 6/2005 |
| JP | 2006-065698 A | 3/2006 |
| JP | 2006-190217 A | 7/2006 |
| JP | 2006-218820 A | 8/2006 |
| JP | 2006-235664 A | 9/2006 |

* cited by examiner

FIG. 4

| SHEET FEED TRAY | TRAY ID | | |
|---|---|---|---|
| TRAY 1 | 10 | 20 | 30 |
| TRAY 2 | 11 | 21 | |
| TRAY 3 | 4 | | |
| TRAY 4 | | | |

FIG. 5

| TRAY ID | DEVICE TYPE A |
|---|---|
| 1 | TRAY 1 |
| 2 | TRAY 2 |
| 3 | TRAY 3 |
| 4 | TRAY 4 |

FIG. 6

| SHEET FEED TRAY | DEVICE-DEPENDENT DEFAULT VALUE | TRAY ID DESIGNATED BY USER + DEVICE-DEPENDENT DEFAULT ID TRAY | | |
|---|---|---|---|---|
| TRAY 1 | 1 | 10 | 20 | 30 |
| TRAY 2 | 2 | 11 | 21 | |
| TRAY 3 | 3 | 4 | | |
| TRAY 4 | 4 | 4 | | |

WHEN USER DOES NOT DESIGNATE TRAY ID, DEVICE-DEPENDENT DEFAULT VALUE IS USED

FIG. 9A

| TRAY ID (TRAY) | SHEET SIZE/ SHEET TYPE |
|---|---|
| 10 (TRAY 1) | A4 · Plain |
| 20 (TRAY 1) | A4 · Plain |
| 30 (TRAY 1) | A4 · Plain |
| 11 (TRAY 2) | Letter · Plain |
| 21 (TRAY 2) | Letter · Plain |
| 4 (TRAY 3) | A4 · Plain |
| 4 (TRAY 4) | A3 · Plain |

DELETED → 4 (TRAY 4) A3 · Plain

FIG. 9B

| TRAY ID (TRAY) | SHEET SIZE/ SHEET TYPE |
|---|---|
| 10 (TRAY 1) | A4 · Plain |
| 20 (TRAY 1) | A4 · Plain |
| 30 (TRAY 1) | A4 · Plain |
| 11 (TRAY 2) | Letter · Plain |
| 21 (TRAY 2) | Letter · Plain |
| 4 (TRAY 3) | A4 · Plain |
| 100 (TRAY 4) | A3 · Plain |

ALLOCATION OF NEW NUMBER → 100 (TRAY 4)

FIG. 10A

| PRIORITY | TRAY | TRAY ID |
|---|---|---|
| 1 | TRAY 1 | 10 |
| | | 20 |
| | | 30 |
| 2 | TRAY 2 | 11 |
| | | 21 |
| 3 | TRAY 3 | 4 |
| 4 | TRAY 4 | 4 |

DELETED (last row)

FIG. 10B

| PRIORITY | TRAY | TRAY ID |
|---|---|---|
| 1 | TRAY 1 | 10 |
| | | 20 |
| | | 30 |
| 2 | TRAY 2 | 11 |
| | | 21 |
| 3 | TRAY 3 | 4 |
| 4 | TRAY 4 | 100 |

ALLOCATION OF NEW NUMBER

FIG. 12A

| TRAY ID (TRAY) | SHEET SIZE/ SHEET TYPE |
|---|---|
| 10 (TRAY 1) | A4 · Plain |
| 20 (TRAY 1) | A4 · Plain |
| 30 (TRAY 1) | A4 · Plain |
| 11 (TRAY 2) | Letter · Plain |
| 21 (TRAY 2) | Letter · Plain |
| 4 (TRAY 3) | A4 · Plain |
| 4 (TRAY 4) | A3 · Plain |

DELETED → 4 (TRAY 4) / A3 · Plain

FIG. 12B

| TRAY ID (TRAY) | SHEET SIZE/ SHEET TYPE |
|---|---|
| 10 (TRAY 1) | A4 · Plain |
| 20 (TRAY 1) | A4 · Plain |
| 30 (TRAY 1) | A4 · Plain |
| 11 (TRAY 2) | Letter · Plain |
| 21 (TRAY 2) | Letter · Plain |
| 4 (TRAY 3) | A4 · Plain |
| 5 (TRAY 4) | A3 · Plain |

ALLOCATION OF NEW NUMBER → 5 (TRAY 4)

FIG. 13A

| PRIORITY | TRAY | TRAY ID |
|---|---|---|
| 1 | TRAY 1 | 10 |
|   |        | 20 |
|   |        | 30 |
| 2 | TRAY 2 | 11 |
|   |        | 21 |
| 3 | TRAY 3 | 4 |
| 4 (DELETED) | TRAY 4 | 4 |

FIG. 13B

| PRIORITY | TRAY | TRAY ID |
|---|---|---|
| 1 | TRAY 1 | 10 |
|   |        | 20 |
|   |        | 30 |
| 2 | TRAY 2 | 11 |
|   |        | 21 |
| 3 | TRAY 3 | 4 |
| 4 | TRAY 4 | 5 (ALLOCATION OF NEW NUMBER) |

IMAGE FORMING APPARATUS, TRAY ID ALLOCATING METHOD THEREOF, COMPUTER PROGRAM PRODUCT, AND RECORDING MEDIUM

CROSS-REFERENCE TO RELATED APPLICATIONS

This application is based upon and claims the benefit of priority from Japanese Patent Application No. 2006-181344, filed Jun. 30, 2006, the entire contents of which are incorporated herein by reference.

BACKGROUND OF THE INVENTION

1. Field of the Invention

The present invention relates to an image forming apparatus such as a copying machine, a printer device, and a facsimile, a tray ID allocating method of the image forming apparatus, a computer program product including a computer-readable recording medium on which a program that is executed by a computer (CPU) controlling the image forming apparatus is recorded, and the computer-readable recording medium.

2. Description of the Related Art

Manufacturers of image forming apparatuses set different tray IDs for identifying sheet feed trays.

Some image forming apparatuses have a function of designating plural tray IDs to one sheet feed tray so that the same sheet feed tray can be identified by different tray IDs. Even in such image forming apparatuses, when the user does not designate a tray ID for a sheet feed tray, a default tray ID is used as the tray ID for identifying the sheet feed tray.

On the other hand, Japanese Patent Application Laid-Open No. 2002-281111 discloses a technique relating to a protocol analyzer that can perform an analysis based on an original protocol and an extended protocol by registering the original protocol and the extended protocol.

In the conventional image forming apparatuses, however, when the user designates a tray ID to one sheet feed tray and the tray ID happens to match with a default tray ID (i.e., initial tray ID) of other sheet feed tray, this tray becomes unusable.

Though the technique described in Japanese Patent Application Laid-Open No. 2002-281111 appears to be applicable for eliminating such an inconvenience, the technique is device-dependent and cannot be applied to the image forming apparatus suffering from such inconvenience.

SUMMARY OF THE INVENTION

It is an object of the present invention to at least partially solve the problems in the conventional technology.

According to one aspect of the present invention, an image forming apparatus having at least one tray for feeding or discharging a sheet, includes an input tray ID holding unit which holds an input tray ID that is optionally input so as to identify the tray, an initial tray ID holding unit which holds an initial tray ID set beforehand so as to identify the tray, a tray ID comparing unit which compares the input tray ID and the initial tray ID, and a tray ID allocating unit which allocates a new tray ID to the tray to which the initial tray ID is allocated, when the input tray ID and the initial tray ID are found overlapped as a result of the comparison by the tray ID comparing unit.

According to another aspect of the present invention, a tray ID allocating method in an image forming apparatus having at least one tray for feeding or discharging a sheet, includes holding an input tray ID that is optionally input so as to identify the tray, holding an initial tray ID set beforehand so as to identify the tray, comparing the input tray ID and the initial tray ID, and allocating a new tray ID to the tray to which the initial tray ID is allocated, when the input tray ID and the initial tray ID are found overlapped as a result of the comparing.

According to still another aspect of the present invention, a computer program product includes a computer usable medium having computer readable program codes embodied in the medium that, when executed, cause a computer, which controls an image forming apparatus having at least one tray for feeding or discharging a sheet, to execute a method according to the present invention.

According to still another aspect of the present invention, a computer-readable recording medium that stores therein a tray ID allocating program that causes a computer to execute a method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is one example of a tray ID management table in a device information management application in FIG. 3;

FIG. 5 is one example of device-dependent default tray ID management information held by a tray ID processing unit in FIG. 3;

FIG. 6 is one example of the tray ID management table representing the result of merging of the tray ID management information shown in FIG. 4 and the device-dependent default tray ID information shown in FIG. 5;

FIGS. 9A and 9B are tables showing one example of the result in which the change in the tray management table is reflected on the subject-device tray information holding area of FIG. 3 as compared to the conventional case;

FIGS. 10A and 10B are tables showing one example of the result in which the change in the tray management table is reflected on the tray priority order holding area of FIG. 3 as compared to the conventional case;

FIGS. 12A and 12B are tables showing another example of the result in which the change in the tray management table is reflected on the subject-device tray information holding area of FIG. 3 as compared to the conventional case; and FIGS. 13A and 13B are tables showing another example of the result in which the change in the tray management table is reflected on the tray priority order holding area of FIG. 3 as compared to the conventional case.

DETAILED DESCRIPTION OF THE PREFERRED EMBODIMENTS

Embodiments of the present invention will be explained in detail below with reference to the accompanying drawings.

Figure 1:
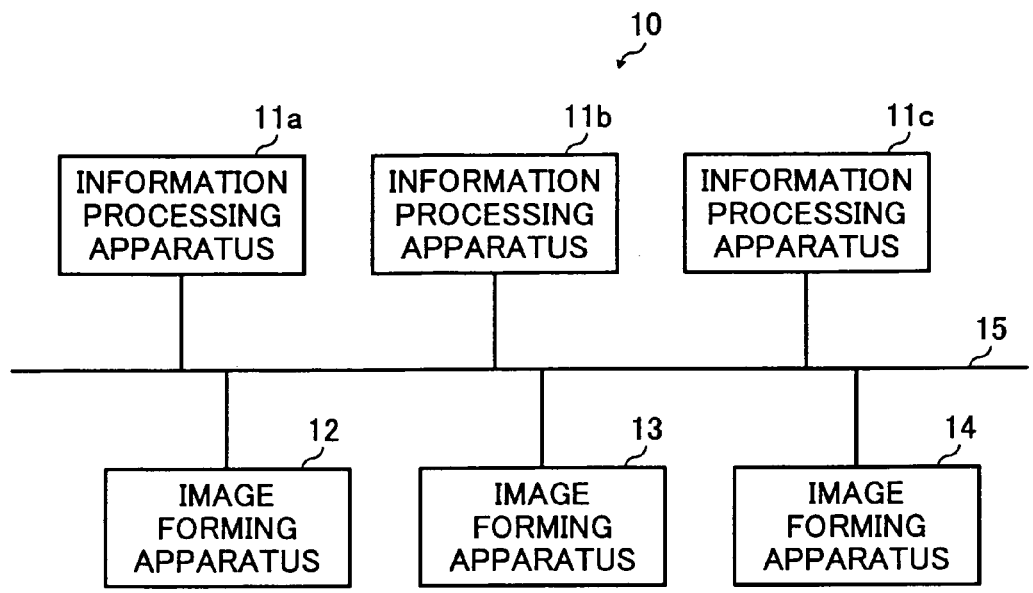
FIG. 1 is a diagram showing one example of an overall configuration of an image forming system including an image forming apparatus according to an embodiment of the present invention.

FIG. 1 is a diagram showing one example of an overall configuration of an image forming system using an image forming apparatus according to an embodiment of the present invention.

An image forming system 10 includes information processing apparatuses 11a to 11c represented by a PC (personal computer) or a server, and image forming apparatuses 12 to 14 represented by a printer or a copying machine.

Each of the information processing apparatuses 11a to 11c and the image forming apparatuses 12 to 14 is connected to each other via a communication network 15, e.g., LAN (local area network), so as to allow transmission of data. The image forming apparatuses 12 to 14 have a function of printing, by way of example. The image forming apparatuses 12 to 14 may additionally have functions of copying, faxing, and scanning, for example.

Each of the information processing apparatuses 11a to 11c generates a printer control command (a command described in a printer description language) using a driver, and selectively transmits the generated printer control command to the image forming apparatuses 12 to 14 connected via the communication network 15. The image forming apparatuses 12 to 14 are each equipped with a printer emulator that interprets the printer control command.

Each of the image forming apparatuses 12 to 14 has plural trays (or may have one tray). Each of the image forming apparatuses 12 to 14 receives the printer control command transmitted from the information processing apparatuses 11a to 11c, and performs, in accordance with the printer control command, an image forming process (printing process) for forming an image on a print medium such as a sheet of paper selectively fed from each tray.

The image forming system 10 is not limited to the one having the configuration shown in FIG. 1. For example, the image forming system may have only one information processing apparatus. Further, there is no limitation on the number of the image forming apparatuses.

Hardware Configuration of Image Forming Apparatus

A hardware configuration of each of the image forming apparatuses 12 to 14 shown in FIG. 1 will be explained with reference to FIG. 2.

Figure 2:
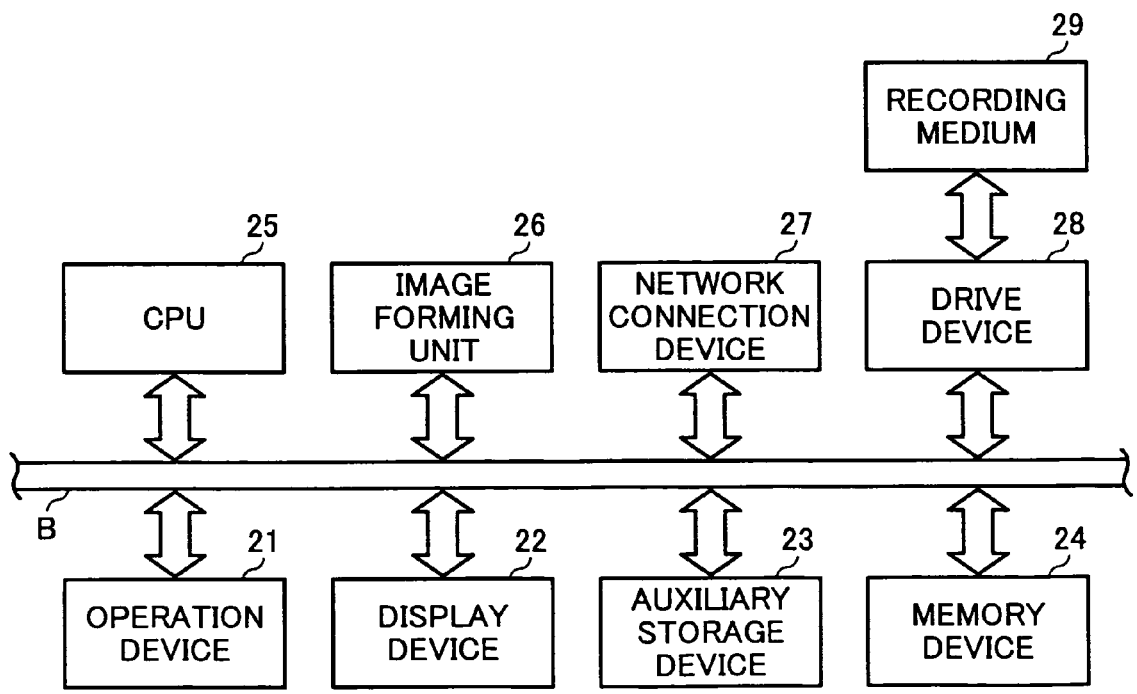
FIG. 2 is a block diagram showing one example of a hardware configuration of the image forming apparatus of FIG. 1.

FIG. 2 is a block diagram of one example of the hardware configuration of each of the image forming apparatuses 12 to 14.

Each of the image forming apparatuses 12 to 14 has an operation device 21, a display device 22, an auxiliary storage device 23, a memory device 24, a CPU (control process unit) 25 that performs various controls, an image forming unit 26, a network connection device 27, and a drive device 28, those of which are interconnected with a system bus B.

The operation device 21 accepts information (data) supplied by a user for forming an image on a print medium. The operation device 21 has a touch panel or a key input unit for receiving predetermined information.

The display device 22 displays a change in a later-described tray ID parameter made by a user through the operation device 21, data input by the user, condition upon the print execution, etc. under the control of the CPU 25 which executes a control program. A monitor or the like is used as the display device 22. The operation device 21 may be incorporated into the display device 22 as a touch panel.

The auxiliary storage device 23 is a storage unit such as a hard disk. The auxiliary storage device 23 stores a later-described execution program according to an embodiment of the present invention, a control program for controlling each unit of the image forming apparatuses 12 to 14, a later-described table, for example, and data can be input and output according to need.

The memory device 24 stores the execution program or the like read from the auxiliary storage device 23 by the CPU 25. The memory device 24 includes a ROM (read-only memory) or RAM (random access memory).

The CPU 25 controls overall processes of the computer to execute respective processes of image formation and the like based on the control program and the execution program read and stored in the memory device 24. Specifically, the CPU 25 performs various computations, and performs data input and data output to/from each hardware component. Further, the CPU 25 performs an image forming process according to the execution program stored in the memory device 24.

The image forming unit 26 selectively feeds a print medium from each tray and performs an image forming process onto the print medium under the control of the CPU 25 according to instructions given by the user as a result of manipulation of the operation device 21 or instructions supplied from other terminal (any one of the information processing apparatuses 11a to 11c and other image forming apparatuses) via the network connection device 27.

The network connection device 27 is connected to the communication network 15, and acquires various types of data from other terminals connected to the communication network 15.

The network connection device 27 downloads the execution program according to an embodiment of the present invention from the other terminals or the like (information processing apparatuses 11a to 11c or other image forming apparatuses) and installs the execution program on the auxiliary storage device 23 or the like under the control of the CPU 25 so that the execution program can be utilized. Further, the network connection device 27 can send results of execution or the execution program according to an embodiment of the present invention to the other terminals or the like.

The execution program is obtained not only from the communication network 15. For example, the execution program can be obtained from a recording medium 29 such as a memory card and CD-ROM. The recording medium 29 having recorded thereon the execution program can be mounted (inserted) to the drive device 28. Then, the drive device 28 can install the execution program on the auxiliary storage device 23.

The drive device 28 is also capable of recording the execution program according to an embodiment of the present invention to the recording medium 29 under the control of the CPU 25. Thus, the execution program can easily be installed on the other terminals from the recording medium 29, whereby the processing according to an embodiment of the present invention can be performed on each terminal.

Since the printer description language does not define the tray ID specifically, each of the image forming apparatuses 12 to 14 uses different tray IDs depending on its manufacturer and model.

Therefore, when one of the information processing apparatuses 11a to 11c sends a tray ID to one of the image forming apparatuses 12 to 14, the image forming apparatus which receives the tray ID may not be able to properly recognize the tray ID. Then, even if the sender apparatus intends to feed a sheet from a regular sheet feed tray 1, the receiver apparatus may carry out a completely different operation. Proposed for the elimination of such inconveniences is the function of allowing the user to allocate plural different tray IDs to one tray via an operation on the web (in other words, an operation on one of the information processing apparatuses 11a to 11c). Hereinafter, when a certain effect is made through an operation on the web by the user, such effect may simply be referred to as made "by the user".

In the process according to an embodiment of the invention, when a tray ID designated by a user (input tray ID) is the same with one of device-dependent default tray IDs stored in each apparatus depending on the device type as a default (initial) tray ID (a tray ID used in the event that the tray ID is not designated by the user), the tray ID designated by the user is prioritized, and a new tray ID is allocated to the tray to which the device-dependent default tray ID is allocated.

Functional Configuration of Image Forming Apparatus

An example of the configuration of functional units (functional units necessary for the user to designate the tray ID to the image forming apparatus that the user intends to use on the web) in the information processing apparatuses 11a to 11c and image forming apparatuses 12 to 14 shown in FIG. 1 according to an embodiment of the present invention will be explained with reference to FIG. 3.

Figure 3:
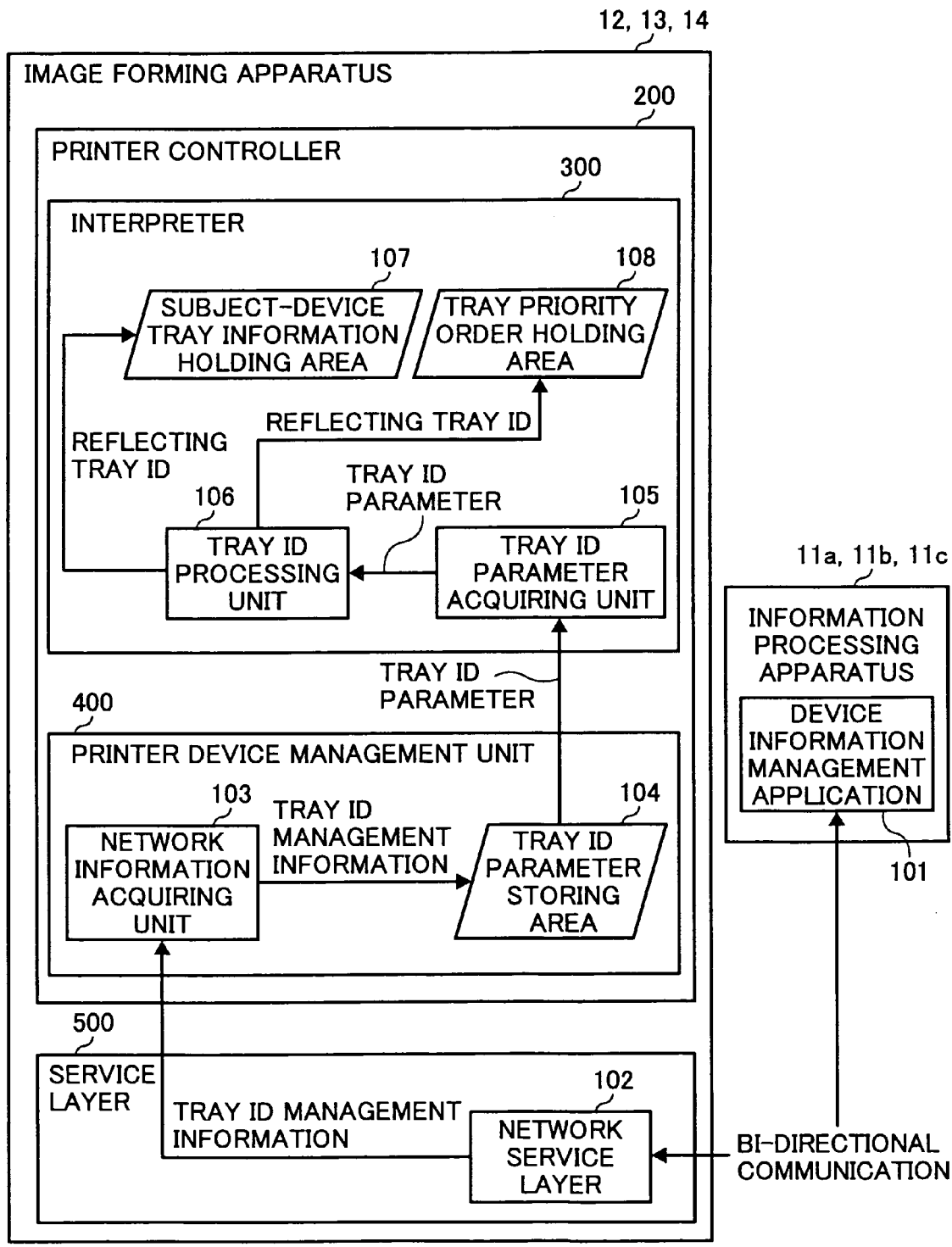
FIG. 3 is a block diagram showing an example of a configuration of functional units in an information processing apparatus and the image forming apparatus according to the present invention as shown in FIG. 1.

FIG. 3 is a block diagram of the example of the configuration of the functional units in the information processing apparatuses 11a to 11c and the image forming apparatuses 12 to 14 shown in FIG. 1 according to an embodiment of the present invention.

Each of the image forming apparatuses 12 to 14 has a printer controller 200 and a service layer 500. These functional units include the functional units such as an input tray ID holding unit, an initial tray ID holding unit, a tray ID comparing unit, and a tray ID allocating unit, and can be realized by the execution of the execution program by the CPU 25.

The printer controller 200 has an interpreter 300 and a printer device management unit 400.

The interpreter 300 includes a tray ID parameter acquiring unit 105, a tray ID processing unit 106, a subject-device tray information holding area 107, and a tray priority order holding area 108.

The printer device management unit 400 includes a network information acquiring unit 103 and a tray ID parameter storing area 104.

The service layer 500 includes a network service layer 102.

On the other hand, each of the information processing apparatuses 11a to 11c includes a device information management application 101. This program (software) is stored in a memory (not shown) and executed by a CPU (not shown), thereby managing the information of each of the information processing apparatuses 11a to 11c.

Each process is explained as being executed by the program itself for the convenience of the explanation.

The device information management application 101 can perform a bi-directional communication with the network service layer 102 of the information processing apparatuses 11a to 11c. The device information management application 101 reports tray ID management information including a tray ID parameter designated by the user for each tray (in other words, designated by the user's operation of an input unit not shown) to the network service layer 102 of any one of the image forming apparatuses 12 to 14.

The network service layer 102 of each of the image forming apparatuses 12 to 14 receives the tray ID management information.

The network information acquiring unit 103 of each of the image forming apparatuses 12 to 14 acquires the tray ID management information from the network service layer 102, and sets and stores the acquired tray ID management information in the tray ID parameter storing area 104.

The tray ID parameter acquiring unit 105 acquires the tray ID parameter from the tray ID parameter storing area 104.

The tray ID processing unit 106 causes the tray ID parameter acquiring unit 105 to acquire the tray ID parameter and set and store the acquired tray ID parameter in a tray ID management table. The tray ID processing unit 106 checks whether the acquired tray ID parameter overlaps with a device-dependent default tray ID (initial tray ID) set beforehand. If there is a device-dependent default tray ID overlaps with the acquired tray ID parameter, a new tray ID is allocated to a tray designated by this device-dependent default tray ID. The change is reflected in the subject-device tray information storing area 107 and the tray priority order holding area 108.

The subject-device tray information storing area 107 holds the information relating to the tray of the subject device.

The tray priority order holding area 108 holds the information relating to the order of priority of the tray.

The user can obtain the information in the holding areas through the bi-directional communication by manipulating the input unit of any one of the information processing apparatuses 11a to 11c.

Tray ID Management Table

The tray ID management table will be explained with reference to FIGS. 4 to 6.

FIG. 4 is a table showing one example of the tray ID management information reported by the device information management application 101 shown in FIG. 3.

In the tray ID management information, each tray is associated with a tray ID. Plural tray IDs designated by the user are associated with the trays 1 and 2. A tray ID designated by a single user is associated with a tray 3. A tray ID is not associated with a tray 4.

The device information management application 101 shown in FIG. 3 transmits the tray ID management information (information including the tray ID designated by a user) to the network service layer 102.

FIG. 5 is a table showing one example of the device-dependent default tray ID (initial tray ID) management information held by the tray ID processing unit 106 shown in FIG. 3.

The device-dependent default tray ID is used in the event that the tray ID is not designated by a user. The device-dependent default tray ID is set beforehand and held by the tray ID processing unit 106 in association with each tray.

The tray ID processing unit 106 merges the tray ID management information shown in FIG. 4 acquired by the tray ID parameter acquiring unit 105 and the device-dependent default tray ID management information shown in FIG. 5 while prioritizing the tray ID designated by the user over the device-dependent default tray ID.

FIG. 6 is a table showing one example of the tray ID management table indicating the merged result.

In this example, since the tray ID is not designated to the tray 4 by a user, only "4" that is the device-dependent default tray ID is associated with the tray 4.

Image forming apparatuses according to different embodiments of the present invention will be explained in detail below with reference to FIGS. 7 to 13. Each of the image forming apparatuses 12 to 14 has regular sheet feed trays 1 to 7, a manual sheet feed tray, and a large-capacity sheet feed tray as usable trays.

First Embodiment

A first embodiment will be explained with reference to FIGS. 7 to 10.

When the tray ID designated by a user overlaps with the device-dependent default tray ID, each of the image forming apparatuses 12 to 14 allocates, as a new tray ID, a tray ID of "100" or any of the subsequent numbers to the tray to which the device-dependent default tray ID is allocated. In this case, "0" to "99" are used as the device-dependent default tray ID and the tray ID (existing tray ID) designated by a user. The number allocated as the new tray ID is not limited to "100" and any of the subsequent numbers. For example, it may be "200" or any of its subsequent numbers.

Figure 7:
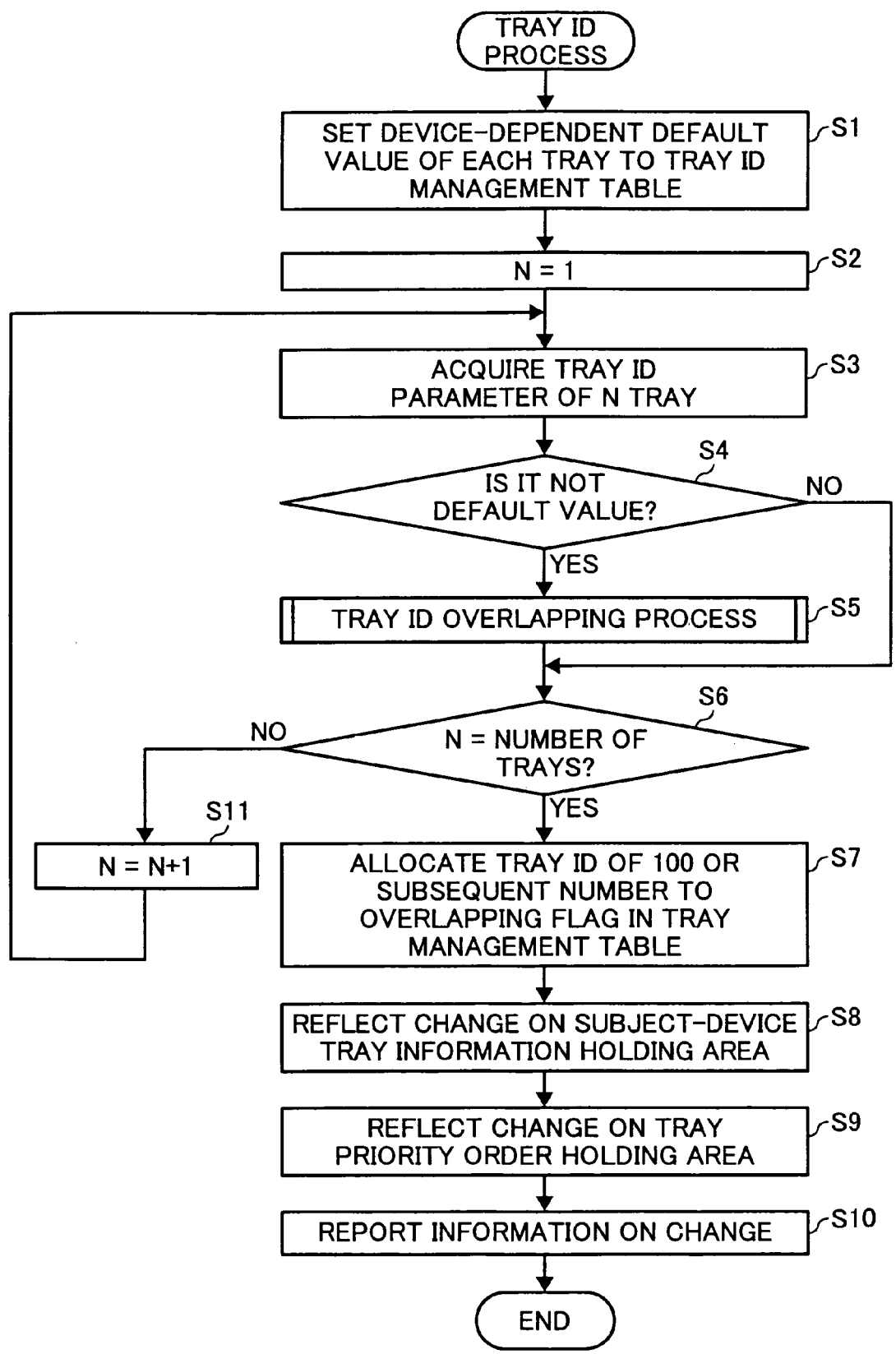
FIG. 7 is a flowchart showing a first example of a tray ID process by the tray ID processing unit shown in FIG. 3.

FIG. 7 is a flowchart of one example of a tray ID parameter process (a process for forming a tray ID management table in which the device-dependent default tray ID management information and the tray ID management information including the tray ID designated by a user are merged) by the tray ID processing unit 106 of each of the image forming apparatuses 12 to 14.

When called by a main routine not shown, the tray ID processing unit 106 of each of the image forming apparatuses 12 to 14 starts the process shown in FIG. 7. Firstly, the tray ID processing unit 106 sets the device-dependent default tray IDs (device default value) of respective trays in the device-dependent default tray ID management information set beforehand to the tray ID management table at step S1, and sets a count value N of a tray designating counter (not shown) to "1" at step S2.

The tray designating counter is used for designating the tray corresponding to a processed tray ID parameter. In this example, if the count value N of the tray designating counter is "1", the regular sheet feed tray 1 is the tray corresponding to the processed tray ID parameter (hereinafter such tray will sometimes be referred to as "N tray"), if the count value N is "2", the regular sheet feed tray 2 is the N tray, if the count value N is "3", the regular sheet feed tray 3 is the N tray, if the count value N is "4", the regular sheet feed tray 4 is the N tray, if the count value N is "5", the regular sheet feed tray 5 is the N tray, if the count value N is "6", the regular sheet feed tray 6 is the N tray, if the count value N is "7", the regular sheet feed tray 7 is the N tray, if the count value N is "8", the manual sheet feed tray is the N tray, and if the count value N is "9", the large-capacity sheet feed tray is the N tray.

Then, at step S3, the tray ID processing unit 106 causes the tray ID parameter acquiring unit 105 to acquire the tray ID parameter corresponding to the N tray (starting from the regular sheet feed tray 1) from the tray ID parameters (including the tray IDs designated by the user for respective trays) in the tray ID management information stored in the tray ID parameter storing area 104, and temporarily stores the acquired tray ID parameter in a temporary storing area (not shown). The tray ID parameter corresponds to the tray ID designated by the user or the default value (free information) that is a parameter other than the designated tray ID. When the tray ID is not designated by the user, the tray ID parameter is not rewritten, so that the default value is used as unchanged. Therefore, the default value is acquired.

Subsequently, it is determined at step S4 whether or not all the tray ID parameters stored in the temporary storing area corresponding to the N tray are default values. If they are all default values, the program proceeds to step S6 without any alteration, and if any one of them is not the default value, a tray ID overlapping process described later is performed at step S5, and then, the program proceeds to step S6.

It is determined at step S6 whether the count value N of the tray designating counter has reached the number of the trays ("9" in this example) or not. The program proceeds to the process at step S11 or step S7 in accordance with the result of the determination. Before the explanation of these processes, the tray ID overlapping process at step S5 will be explained with reference to FIG. 8.

Figure 8:
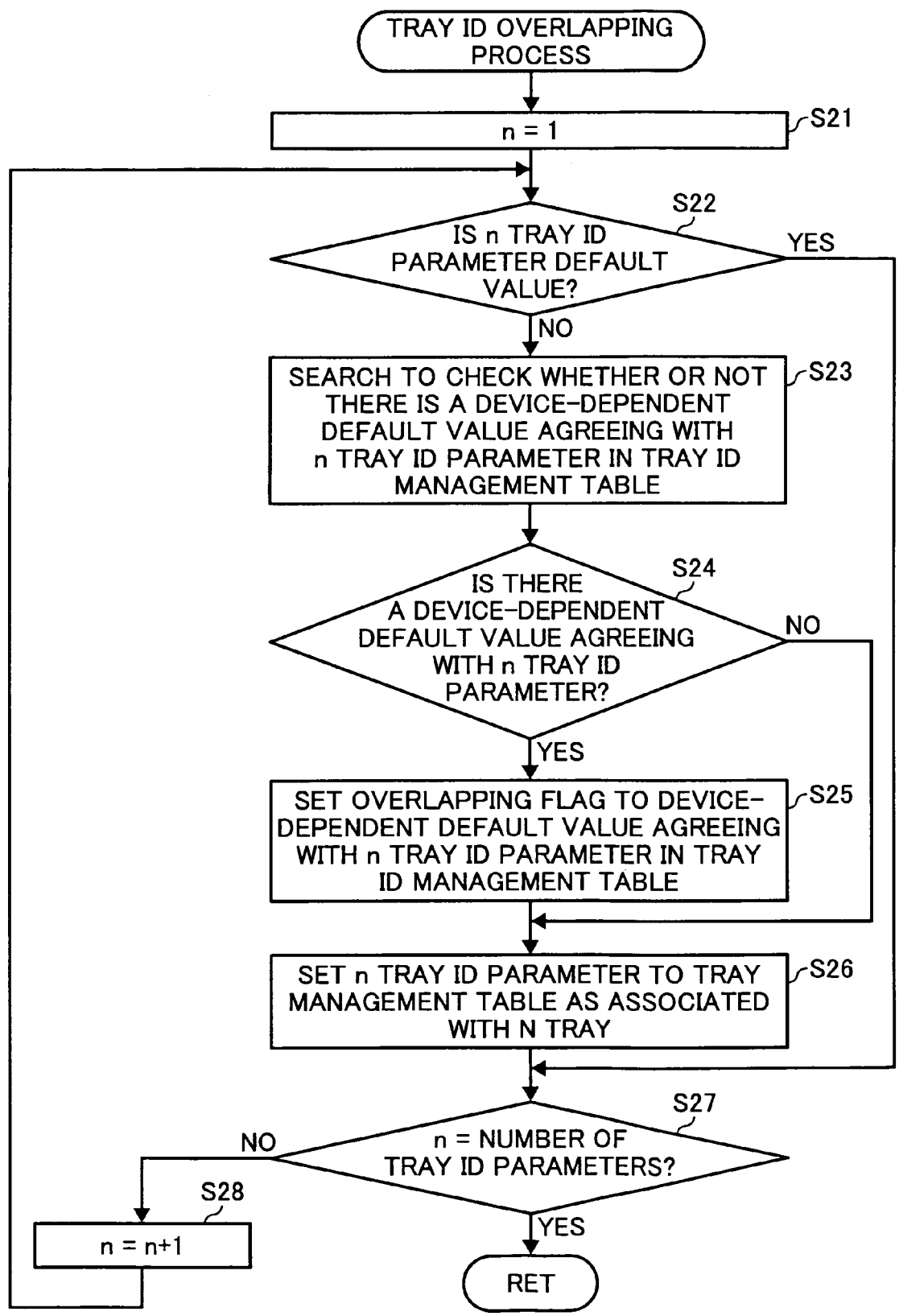
FIG. 8 is a flowchart showing one example of a subroutine of a tray ID overlapping process in FIG. 7.

FIG. 8 is a flowchart of one example of a subroutine of the tray ID overlapping process.

The tray ID processing unit 106 of each of the image forming apparatuses 12 to 14 firstly sets the count value n of a tray ID parameter designating counter (not shown) to "1" at step S21.

The tray ID parameter designating counter is used for designating the processed tray ID parameter. For example, when the tray ID parameters stored in the temporary storing area corresponding to the N tray are "10", "30", and "default value", the tray ID corresponding to the N tray is "10" if the count value n is "1", the tray ID corresponding to the N tray is "30" if the count value n is "2", and the tray ID corresponding to the N tray is "default value" if the count value n is "3".

Next, it is determined at step S22 whether or not the tray ID parameter corresponding to the count value n ("1") of the tray ID parameter designating counter (hereinafter sometimes simply referred to as "n tray ID parameter") is the default value. If it is the default value, the program proceeds to step S27. If it is not the default value (if it is one of the tray IDs designated by the user), the program proceeds to step S23.

At step S23, the tray ID processing unit 106 searches to check whether there is a device-dependent default tray ID agreeing with the n tray ID parameter in the device-dependent default tray IDs in the tray ID management table.

When there is no device-dependent default tray ID agreeing with the n tray ID parameter in the device-dependent default tray IDs in the tray ID management table as a result of the search, the program proceeds to step S26 without any alteration. When there is a device-dependent default tray ID agreeing with the n tray ID parameter, the tray ID processing unit 106 sets at step S25 an overlapping flag (temporal value) to the device-dependent default tray ID, which agrees with the n tray ID parameter, in the tray ID management table, and then, the program proceeds to step S26.

The tray ID processing unit 106 sets at step S26 the n tray ID parameter (n tray ID designated by the user) to the tray ID management table as associated with the N tray.

Thereafter, the tray ID processing unit 106 determines whether or not the count value n of the tray ID parameter designating counter has reached the number of the tray ID parameters of the N tray (e.g., "3"). If the count value n has not reached the number of the tray ID parameters, the program proceeds to step S28 where the count value n of the tray ID parameter designating counter is incremented (+1), and then, the processes at step S22 and the following steps are performed again.

When the count value n of the tray ID parameter designating counter has reached the number of the tray ID parameters, the process shown in FIG. 8 is ended, and the program returns to the process routine shown in FIG. 7 where the program proceeds to step S6.

It is determined at step S6 whether the count value N of the tray designating counter has reached the number of the trays or not.

When the count value N of the tray designating counter has not reached the number of the trays, the program proceeds to step S11 so as to increment (+1) the count value N of the tray designating counter, and then, the processes at step S3 and the following steps are performed again. These processes are repeatedly performed until the count value N of the tray designating counter reaches the number of the trays, e.g., "9" (the number of the trays of the subject device). Specifically, the processes are successively executed corresponding to the regular sheet feed trays 2 to 7, the manual sheet feed tray, and the large-capacity sheet feed tray.

When the count value N of the tray designating counter has reached the number of the trays, the program proceeds to step S7 where the following process is executed.

Specifically, when the tray ID (input tray ID) designated by the user and the device-dependent default tray ID (initial tray ID) agree with each other, the overlapping flag of the tray ID management table is referred to, and the tray ID of "100" or subsequent number, which is different from the tray ID designated by the user and the device-dependent default tray ID, is searched and allocated to the overlapping flag. The overlapping flag is overwritten with this tray ID. If there are plural overlapping flags, a tray ID different from each other is allocated to each of the plural overlapping flags.

Then, the tray ID processing unit 106 reflects the changes of the tray ID management table (new tray ID) on the subject-device tray information holding area 107 at step S8, and reflects the changes of the tray ID management table on the tray priority order holding area 108 at step S9. Thereafter, the tray ID processing unit 106 transmits the information about the changes of the tray ID management table to each of the information processing apparatuses 11a to 11c via the network service layer 102 at step S10 so that the information is displayed on their display devices. The information about the changes of the tray ID management table can be displayed on the display device 22 shown in FIG. 2, printed on a print medium by the image forming unit 26, or can be output as a sound by a sound output unit such as a speaker.

FIG. 9B shows an example of the result in which the change of the tray management table is reflected on the subject-device tray information holding area 107. FIG. 10B shows one example of the result in which the change of the tray management table is reflected on the tray priority order holding area 108. For the sake of the convenience of the explanation, among data pieces in these holding areas, data pieces relating to the trays other than the regular sheet feed trays 1 to 4 are not shown.

In this example, "100" is allocated as a new tray ID to the regular sheet feed tray 4. When the tray ID "4" is designated by the user to the regular sheet feed tray 3 whose device-dependent default tray ID is "3", the designated tray ID is the same with the device-dependent default tray ID corresponding to the regular sheet feed tray 4. Conventionally, when the tray IDs of trays are overlapped, the data corresponding to the regular sheet feed tray 4 in the tray ID management table is deleted, and this is reflected on the subject-device tray information holding area and tray priority order holding area, so that the crosshatched data pieces in FIG. 9A and FIG. 10A are deleted. Therefore, the regular sheet feed tray 4 conventionally becomes unusable.

As described above, according to the first embodiment, advantageous effects shown in the following (A1) to (A5) can be obtained.

(A1) An input tray ID (a tray ID designated by a user) optionally input for identifying a tray and an initial tray ID set beforehand are compared, and when the input tray ID and the initial tray ID are found overlapped as a result of the comparison, a new tray ID (reallocated tray ID) is allocated to the tray to which the initial tray ID is allocated. Accordingly, even when the tray ID designated by a user and the initial tray ID used in the event that the user does not designate the tray ID are the same, the tray to which the initial tray ID is allocated can be prevented from becoming unusable.

(A2) Since the reallocated tray ID is held at the holding area of the subject-device tray information that can be acquired by a user from the image forming apparatus as information, the user can designate the corresponding tray and causes a sheet to be fed from this tray by acquiring the reallocated tray ID from the image forming apparatus, which the user intends to use, on a web.

(A3) The information relating to the order of priority of the tray to be used is held at the tray priority order holding area with the tray ID. Since a new tray ID (reallocated tray ID) is allocated to the tray whose initial tray ID overlaps with the input tray ID, there is no chance that the information of this tray is missed. Accordingly, the operation relating to the tray whose initial tray ID overlaps with the input tray ID does not contradict with the information (data sequence indicating the order of priority of trays) in the tray priority order holding area that the user can refer to.

(A4) Since the reallocated tray ID is different from the input tray ID and the initial tray ID, the value used as the reallocated tray ID can easily be searched, so that the processing load of the CPU can be reduced.

(A5) Since the information about the reallocated tray ID (the content of the change of the tray ID) is reported, the user can recognize the reallocation of the tray ID.

Second Embodiment

A second embodiment will specifically be explained with reference to FIGS. 11 to 13.

When the tray ID designated by a user is the same as the device-dependent default tray ID, each of the image forming apparatuses 12 to 14 allocates, as a new tray ID, an optional tray ID of "0" to "n" to the tray whose device-dependent default tray ID is the same with the user-designated tray ID.

Figure 11:
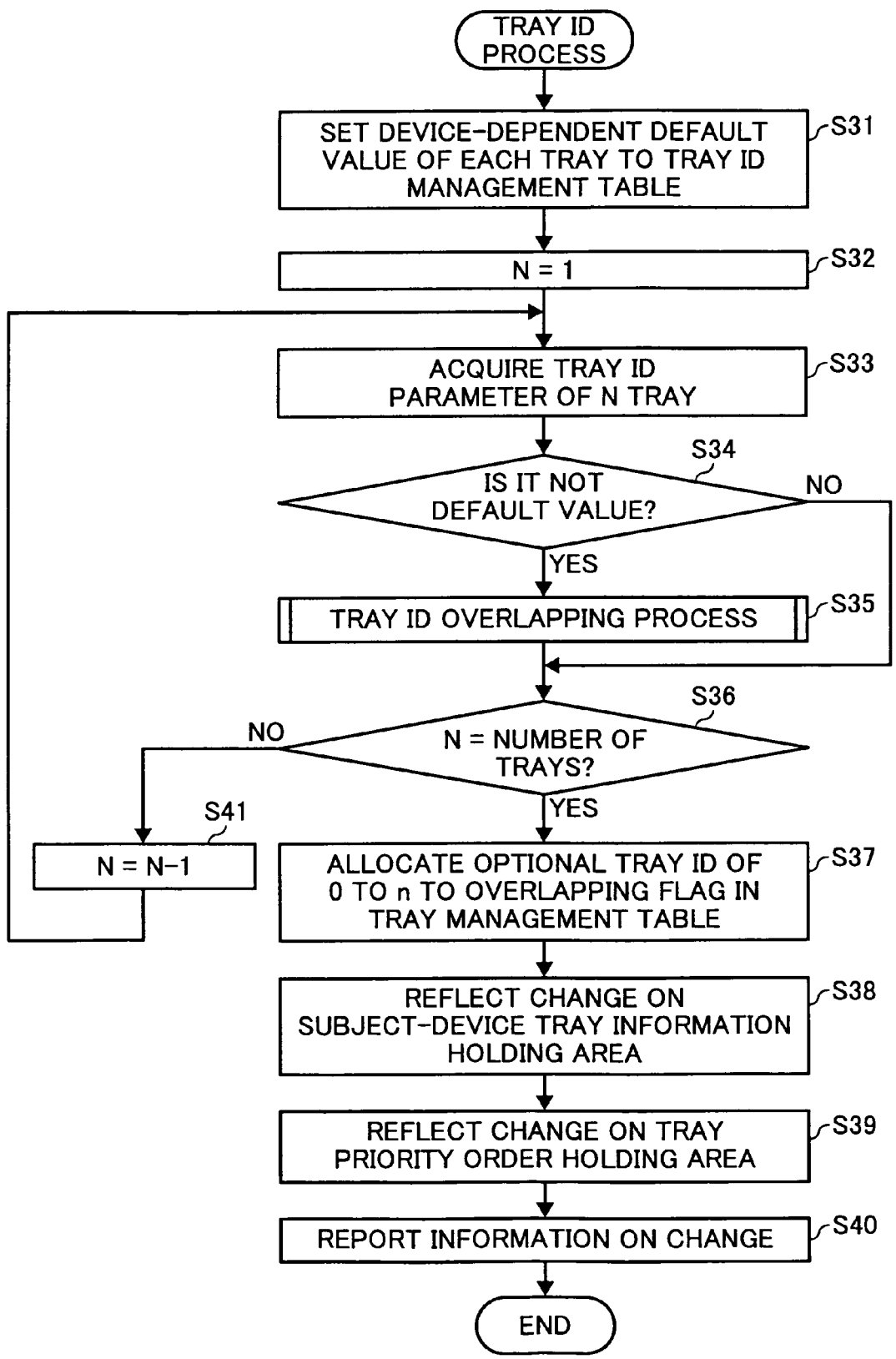
FIG. 11 is a flowchart showing a second example of the tray ID parameter process by the tray ID processing unit shown in FIG. 3.

FIG. 11 is a flowchart of another example of the tray ID process by the tray ID processing unit 106 of each of the image forming apparatuses 12 to 14.

When called by a main routine, the tray ID processing unit 106 of each of the image forming apparatuses 12 to 14 starts the process shown in FIG. 11, and performs processes of steps S31 to S41. These processes are the same as those at steps S to S11 explained with reference to FIGS. 7 and 8 except for some parts. The different process is only the process at step S37 (corresponding to step S7).

When the tray ID designated by a user (input tray ID) is the same with the device-dependent default tray ID (initial tray ID), the overlapping flag of the tray ID management table is referred to, and the optional tray ID of "0" to "n" (note that the tray IDs that have already been used are excluded) is allocated to the overlapping flag at step S37. The overlapping flag is overwritten with this tray ID. If there are plural overlapping flags, the optional tray ID is searched from a low number and successively allocated.

FIG. 12B shows another example of the result in which the change in the tray management table is reflected on the subject-device tray information holding area 107. FIG. 13B shows another example of the result in which the change in the tray management table is reflected on the tray priority order holding area 108. For the sake of the convenience of the explanation, among data pieces in these holding areas, data pieces relating to the trays other than the regular sheet feed trays 1 to 4 are not shown.

In this example, "5" is allocated as a new tray ID to the regular sheet feed tray 4. When the tray ID "4" is designated by the user to the regular sheet feed tray 3 whose device-dependent default tray ID is "3", the designated tray ID is the same with the device-dependent default tray ID corresponding to the regular sheet feed tray 4. Conventionally, when the tray IDs of trays are overlapped, the data corresponding to the regular sheet feed tray 4 in the tray ID management table is deleted, and this is reflected on the subject-device tray information holding area and tray priority order holding area, so that the crosshatched data pieces in FIG. 12A and FIG. 13A are deleted. Therefore, the regular sheet feed tray 4 conventionally becomes unusable.

As described above, according to the second embodiment, the advantageous effects same as the aforesaid (A1) to (A3) and (A5) can be obtained.

Further, since the reallocated tray ID, which is the new tray ID, is an optional value (including the existing value), the memory capacity is reduced, although it takes time to search the value used as the reallocated tray ID.

In the first and the second embodiments, the tray IDs corresponding to the regular sheet feed trays 1 to 7, the manual sheet feed tray, and the large-capacity sheet feed tray can be set as the tray ID corresponding to the usable tray. However, the type of ID that can be set as the tray ID in the present invention is not limited to these. For example, tray IDs corresponding to various sheet discharge trays such as a regular sheet discharge tray can also be set. Further, the value of the tray ID is not limited to a number. For example, a character or the like can be used, and the combination of a character and a number can be used.

Execution Program According to Embodiments of the Invention

An execution program according to an embodiment of the present invention is a program that causes the CPU (computer), which controls the image forming apparatuses 12 to 14, to realize the functional units (functional units such as an input tray ID holding unit, an initial tray ID holding unit, a tray ID comparing unit, and a tray ID allocating unit) according to an embodiment of the present invention. The aforesaid effects can be obtained by causing the CPU to execute the program.

The program described above may be stored in a storing unit such as a ROM or HDD from the beginning. Alternatively, the program described above can be provided as recorded on a recording medium such as CD-ROM or flexible disk, or non-volatile recording medium (memory) such as SRAM, EEPROM, memory card, etc. The program recorded on the memory is installed on the image forming apparatus and executed by the CPU, or the CPU is caused to read the program from the memory for execution, whereby the aforesaid procedure can be executed.

Moreover, the program may be downloaded from an external device that is connected to a network and provided with a recording medium having a program recorded thereon or an external device storing a program in a storing unit, so as to execute the program.

As apparent from the above explanation, according to the present invention, even when a tray ID designated by a user is the same as a default tray ID that is used in the event that a tray ID is not designated by a user for an image forming apparatus, it can be prevented that the tray to which the default tray ID is allocated becomes unusable. Accordingly, the present invention can provide an image forming apparatus that can surely make an image formation regardless of the designation of a tray ID by a user.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus having at least one tray for feeding or discharging a sheet, comprising:
    an input tray information holding unit which holds input tray identification information that is optionally input so as to identify the tray;
    an initial tray information holding unit which holds initial tray identification information set beforehand so as to identify the tray;
    a tray information comparing unit which compares the input tray identification information and the initial tray identification information; and
    a tray information allocating unit which allocates new tray identification information to the tray to which the initial tray identification information is allocated, when the input tray identification information and the initial tray identification information are found to be the same as a result of the comparison by the tray information comparing unit.

2. The image forming apparatus according to claim 1, wherein
    the new tray identification information allocated by the tray information allocating unit is different from the input tray identification information and the initial tray identification information.

3. The image forming apparatus according to claim 1, further comprising:
    an information reporting unit which reports information about the new tray identification information that is allocated by the tray information allocating unit.

4. A tray identification information allocating method in an image forming apparatus having at least one tray for feeding or discharging a sheet, comprising:
    holding input tray identification information that is optionally input so as to identify the tray;
    holding initial tray identification information set beforehand so as to identify the tray;
    comparing the input tray identification information and the initial tray identification information; and
    allocating new tray identification information to the tray to which the initial tray identification information is allocated, when the input tray identification information and the initial tray identification information are found to be the same as a result of the comparing.

5. A computer program product comprising a non-transitory computer readable medium having computer readable program codes embodied in the non-transitory computer readable medium that, when executed, cause a computer, which controls an image forming apparatus having at least one tray for feeding or discharging a sheet, to execute:
    holding input tray identification information that is optionally input so as to identify the tray;
    holding initial tray identification information set beforehand so as to identify the tray;
    comparing the input tray identification information and the initial tray identification information; and
    allocating new tray identification information to the tray to which the initial tray identification information is allocated, when the input tray identification information and the initial tray identification information are found to be the same as a result of the comparing.

6. The computer program product according to claim 5, wherein
the new tray identification information allocated by the allocating is different from the input tray identification information and the initial tray identification information.

7. The computer program product according to claim 5, further comprising
reporting information about the new tray identification information allocated in the allocating.

8. A non-transitory computer-readable recording medium that stores therein a tray identification information allocating program that causes a computer to execute the method according to claim 4.

9. The image forming apparatus of claim 1, wherein the initial tray identification information is a device-dependent default tray identification number and the input tray identification information is a user-designated identification number.

10. The tray identification information allocating method of claim 4, wherein the initial tray identification information is a device-dependent default tray identification number and the input tray identification information is a user-designated identification number.

11. The computer program product of claim 5, wherein the initial tray identification information is a device-dependent default tray identification number and the input tray identification information is a user-designated identification number.

* * * * *